US007743408B2

(12) United States Patent
Aboba et al.

(10) Patent No.: US 7,743,408 B2
(45) Date of Patent: Jun. 22, 2010

(54) SECURE ASSOCIATION AND MANAGEMENT FRAME VERIFICATION

(75) Inventors: Bernard D. Aboba, Bellevue, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1391 days.

(21) Appl. No.: 10/734,817

(22) Filed: Dec. 12, 2003

(65) Prior Publication Data

US 2004/0243846 A1 Dec. 2, 2004

Related U.S. Application Data

(60) Provisional application No. 60/474,743, filed on May 30, 2003.

(51) Int. Cl.
G06F 7/04 (2006.01)
(52) U.S. Cl. .......................................... 726/4; 713/153
(58) Field of Classification Search ................. 713/201; 726/28, 29
See application file for complete search history.

(56) References Cited

U.S. PATENT DOCUMENTS

| 6,134,658 | A | 10/2000 | Multerer et al. |
| 6,230,269 | B1 | 5/2001 | Spies et al. |
| 6,385,724 | B1 | 5/2002 | Beckman et al. |
| 6,604,198 | B1 | 8/2003 | Beckman et al. |
| 6,609,199 | B1 | 8/2003 | DeTreville |
| 6,950,628 | B1 * | 9/2005 | Meier et al. ................. 455/41.2 |
| 2004/0014422 | A1 * | 1/2004 | Kallio ........................ 455/41.1 |
| 2004/0198220 | A1 * | 10/2004 | Whelan et al. ............. 455/41.1 |

OTHER PUBLICATIONS

Aboba, B. et al., "Draft Amendment to Standard for Telecommunications and Information Exchange Between Systems—Lan/Man Specific Requirements", IEEE Standards Department, Oct. 2003.
Davies, Joseph, "Deploying Secure 802.11 Wireless Networks With Microsoft Windows", Microsoft Press, 2003.
Cappiello, M. et al., "Mobility Amongst Heterogenous Networks With AAA Support", pp. 2064-2069, 2002 IEEE International Conference on Communications Proceedings, May 2002.
Cheng, Yi and A. Norefors, "Token Based Authentication for Handover Security", pp. 231-243, IFIP TC6/TC11 Joint Working Conference on Communications and Multimedia Security, Sep. 1999.
Halasz, D. et al., "Pre-Authentication with 802.1X", pp. 1-6, IEEE 802.11-01/258r0, Mar. 2002.

(Continued)

*Primary Examiner*—Nasser Moazzami
*Assistant Examiner*—Carlton V Johnson
(74) *Attorney, Agent, or Firm*—Workman Nydegger

(57) ABSTRACT

Network devices access a communications network and engage in secure associations with one or more network access points upon authenticating the access points and upon verifying the discovery information that is broadcast by the access point. Once a secure association is created, management frames that are subsequently transmitted between the network devices and the access points and that are used to control the secure association are verified to further enhance the security of the communications network.

29 Claims, 4 Drawing Sheets

OTHER PUBLICATIONS

Henning, R.R., "Vulnerability Assessment in Wireless Networks", pp. 358-362, 2003 Symposium on Applications and the Internet, Jan. 2003.

Li, J. et al., "Public Access Mobility Lan: Extending the Wireless Internet into the LAN Environment", pp. 22-30, IEEE Wireless Communications, vol. 9, No. 3, Jun. 2002.

Loutrel, M. and Boukhatem M., "An EAP-BT Smartcard for Authentication in the Next Generation of Wireless Communications", pp. 103-114, Network Control and Engineering for QoS, Security and Mobility, Oct. 2002.

McMahon, M. et al., "Porposed Structure of a Network Security System Using Dynamic Authentication", pp. 183-189, Proceedings of the ISCA $14^{th}$ International Conference, Aug. 2001.

Pack, S. et al., "Pre-Authenticated Fast Handoff in a Public Wireless LAN Based on IEEE 802.1x Model", pp. 1-8, http://mmlab.snu.ac.kr/research/publication/docs/pwc2002_shpack.pdf, Oct. 2003.

Takubo, A., et al. "Security Simulator in Mobile Computing Environment", pp. 89-94, Twelfth International Conference on Information Networking, Jan. 1998.

\* cited by examiner

SECURE ASSOCIATION AND MANAGEMENT FRAME VERIFICATION

CROSS REFERENCE TO RELATED APPLICATIONS

The present application claims the benefit and priority of provisional U.S. Patent No. 60/474,743 filed May 30, 2003, entitled "PRE-AUTHENTICATION AND SECURE ASSOCIATION ON 802.1X NETWORKS," and which is incorporated herein by reference.

BACKGROUND OF THE INVENTION

1. The Field of the Invention

The present invention is related to secure association for network communications. The present invention is also directed to verification of the network communications, including management frames.

2. Background and Relevant Art

Various techniques have been developed for networking devices and enabling communication in wired and wireless networks. Some of these techniques have been adopted and propagated by the IEEE (Institute of Electrical and Electronics Engineers) standards. For example, the 802.11 standard is generally directed at techniques for networking in an over-the-air interface between a wireless client and a base station or between two wireless clients.

Other networking techniques include, but are not limited to Bluetooth, Personal Area Networks (PAN) with Ultra Wide Band (UWB) technologies, and even wireless Wide Area Network technologies such as the General Packet Radio Service (GPRS).

One problem encountered by existing networking technologies involves the potential for a hack to maliciously broadcast false requests and false information about network device. By doing this, it is possible for a hack to effectively terminate a desired association between network devices and to create undesired or unauthorized associations. Such network security threats are more commonly known by such terms as spoofing, network hijacking, data packet forging and modification, resource starvation attacks, impersonation, and so forth, each of which is undesirable.

Some of the available techniques have been implemented to improve the security of networks by requiring that network devices be authenticated by the network prior to being granted access to the network. This level of security is nice, but fails to overcome all of the known problems in the art. For example, a resource starvation attack could still occur when the capabilities of a network access point are publicized incorrectly by a hack, and such that the network access point appears so attractive that all devices in the serviceable range of the access point choose to access the network through that single access point rather than other available access points. Because the network devices do not currently have any way of verifying the publicized capabilities of the access point, such an attack is possible.

Likewise, once a network device is authenticated, it is possible for a hack to hijack the communications coming from the network device to maliciously append the communications with management frames that can effectively terminate or undesirably alter the association between the network device and the access point. One reason for this is that all of the frames transmitted between the network device and the access points of the network are not verified as being authentic prior to their execution.

One hurdle in overcoming the aforementioned problems is the desire to provide flexibility in the network, particularly within wireless networks, where a wireless device, such as a telephone or PDA moves through the serviceable ranges of various access points. In particular, the security requirements placed on network devices during creation of secure associations with the access points can represent expensive processing operations that have to be replicated in existing systems as the network device moves from one access point to another.

Accordingly, there is still an ongoing need for improved methods and systems for networking devices in wireless and wired networks that do not prohibitively restrict the flexibility of the networks.

BRIEF SUMMARY OF THE INVENTION

The present invention is generally directed to methods for providing authentication, secure association, and verification for network communications.

According to one embodiment, network access points enable one or more stations to communicate over a network. The stations can be wireless devices, such as cell phones, as well as wired devices, such as home computers. The capabilities of the various access points are broadcast or otherwise made available to the stations in the form of discovery information.

The stations access the discovery information and determine which of the access points have the best capabilities for facilitating the desired network communications. For example, different access points might provide different signal strengths, transfer rates, security features, available channels, restrictions, and so forth.

Upon selecting an appropriate or desired access point, the station authenticates the access point to verify the access point belongs to the network. In one embodiment, authentication is performed by identifying a certificate that was generated by a network authentication server or other authentication service and that is attached to the discovery information.

Upon authenticating the desired access point, the station then engages in discovery verification with the access point to verify the discovery information that was originally obtained is correct. In doing this, the station sends the discovery information that is to be verified back to the access point along with a key, hash number, certificate, or other identifiable security object obtained during authentication. The access point then verifies the discovery information by sending an acknowledgement receipt back to the station that includes the identifiable security object. In this manner, the station can be confident of the capabilities of the station and a secure association between the station and the access point is created, through which secure communications can occur.

In another embodiment of the invention, management frames and other communications are verified by the access point upon receipt. For example, the management frames or other communications can be attached or signed with a key or another security object by the station. Upon verifying the security object, the access point can then process the management frames. In this manner, it is possible to protect the integrity of the management frames and to ensure that they are authentic.

One benefit of verifying management frames is that it can allow for a fast hand-off as a station roams between different access points, as described below. In particular, a station can transmit a re-association management frame to a secondary access point that includes an identifiable security object obtained from the primary access point and that can be verified by the secondary access point. By doing this, the secondary access point can have confidence the roaming station is authorized to access the network. This technique can also be used to prevent network devices from being booted off of the network by a false disassociation request generated by a hack.

Other methods, systems and features of the invention will be set forth in the description which follows, from the appended specification, or as otherwise learned by the practice of the invention. The features and advantages of the invention may also be realized and obtained by means of the instruments and combinations particularly pointed out in the appended claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
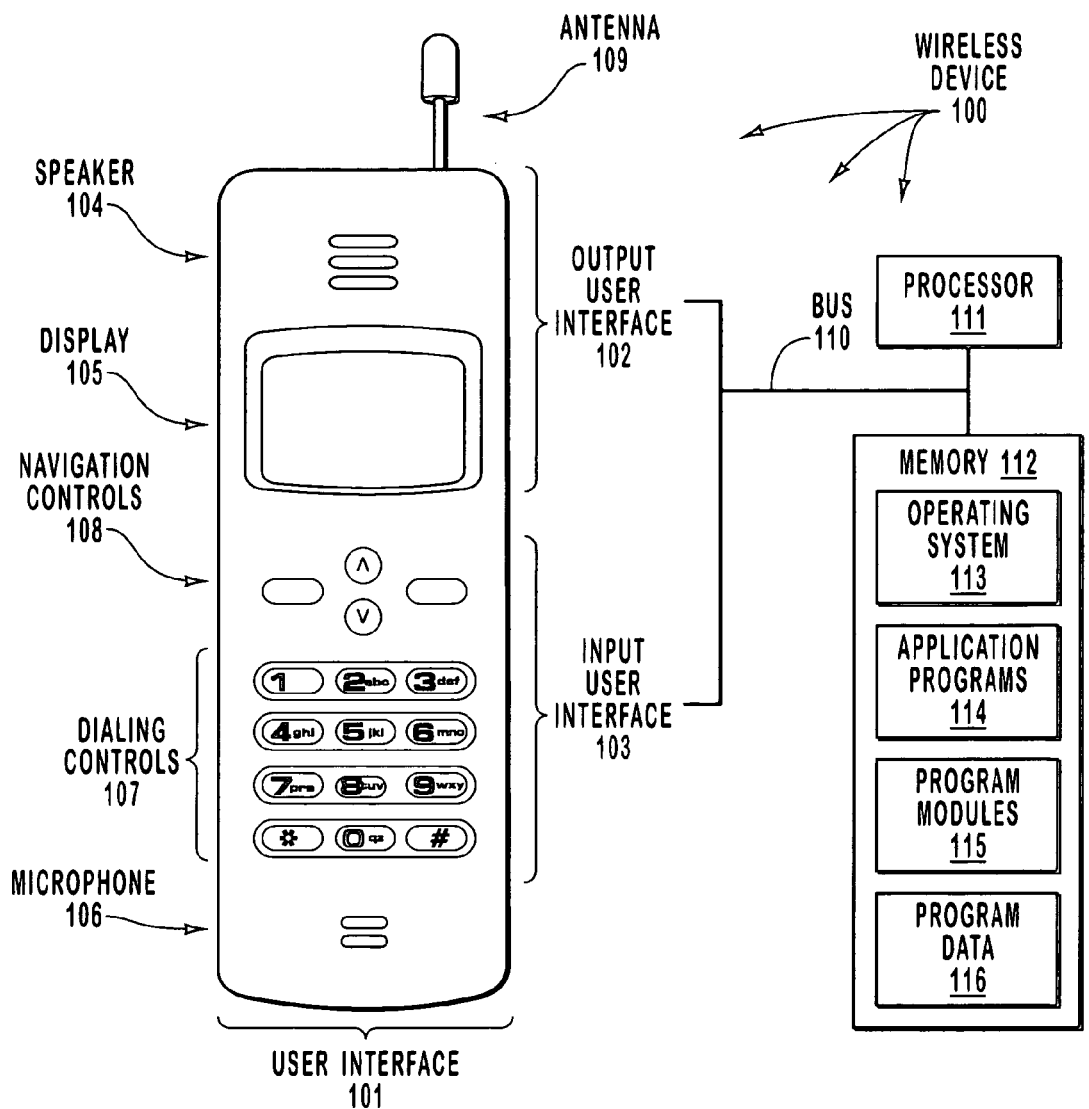
FIG. 1 illustrates a station, comprising a wireless device, in which the principles of the present invention may operate.

The present invention extends broadly to methods and systems for providing secure association between networked devices, including wireless and wired devices, and for verifying communications transmitted between the networked devices.

As described herein, certain embodiments of the invention may be practiced with the use of a special purpose or general purpose computing device including various computer hardware. Embodiments within the scope of the present invention may also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

In certain embodiments of the application, the terms Access Point, Station, and Management Frame are used. To facilitate in the interpretation of the application and the recited claims, the aforementioned terms will now be defined.

The term "Access Point", refers to a network device that is capable of bridging communications between a station and a network communications server. An access point can comprise a wireless access point capable of providing physical layer access to a network through wireless-based transmission and reception technologies, switches that provide physical layer access to a network through traditional LAN technologies (e.g., Ethernet), and network access servers that provide remote access connectivity to an organization's network or the Internet. In wireless communications, it is the access point through which wireless clients gain access to other wireless clients and the wired network.

The term "Station", refers to the client device that is seeking access to other clients and a network by associating with and then authenticating itself to an access point. A station can include a mobile wireless device, as described below in reference to FIGS. 1 and 2, a stationary wired device such as a home computer, or any other computing device capable of communicating through a network.

The term "authentication server," refers to a network communication server that checks credentials of a supplicant and responds whether or not a supplicant is authorized to access an authenticator's services. Accordingly, the authentication server can comprise a part of the access point or a separate entity. In some embodiments, as described below, the authentication server can also provide information that can be used to authenticate an access point.

The term "management frame," generally refers to data that is transmitted between the station and access point that control the association of the station with the access point. Some examples of management frames include association frames, re-association frames, disassociation frames, deauthentication frames, and so forth, that enable and control respective associations between the station and access point. Management frames are well known to those of ordinary skill in the art.

FIG. 1 is now provided to illustrate and describe one example of a suitable computing environment in which the invention may be implemented. Although not required, the invention will be described in the general context of computer-executable instructions, such as program modules, being executed by computing devices. Generally, program modules include routines, programs, objects, components, data structures, and the like that perform particular tasks or implement particular abstract data types.

With reference to FIG. 1, a general purpose computing device is provided, having the form of a wireless device 100. Although the wireless device 100 has the appearance of a telephone, a wide-variety of devices are now capable of communicating over a wireless network and may benefit by employing the principles of the present invention. For example, tablet PCs, Personal Digital Assistants (PDAs), and other wireless devices are now available. Other wireless device forms may also be developed in the future. The principles of the present invention are not limited to the particular form of the wireless device. The illustrated wireless device 100 is just one example of a station that can engage in network communications.

In the present embodiment, the wireless device 100 includes a user interface 101 for allowing a user to input information through an input user interface 103. The user reviews information presented via an output user interface 102. The user interface will vary widely depending on the form factor of the wireless device. In the illustrated embodiment, however, in which the wireless device 100 is a wireless telephone, the output user interface 102 includes a speaker 104 for presenting audio information to the user, as well as a display 105 for presenting visual information to the user.

The input user interface 103 may include a microphone 106 for rendering audio information into electronic form. In addition, the input user interface 103 includes dialing controls 107 and navigations controls 108 that allow the user to input information into the wireless device 100. Although the speaker 104 and the microphone 106 are illustrated as external, the speaker and microphone would typically be integrated with and/or internal to the wireless device 100.

Program code means comprising one or more program modules may be stored in a memory 112. The one of more program modules may include an operating system 113, one or more application programs 114, other program modules 115, and program data 116. The one or more program modules may be instantiated in the memory (if volatile), or loaded from memory (if non-volatile) and then further processed using a processor 111. The program code means may include non-volatile as well as volatile memory and its form may vary greatly depending on the type of wireless device. A bus 110 interconnects the user interface 101, the processor 111, and the memory 112.

While FIG. 1 represents a suitable operating environment for the present invention, the principles of the present invention may be employed with other communications devices, including wired computing devices.

Figure 2:
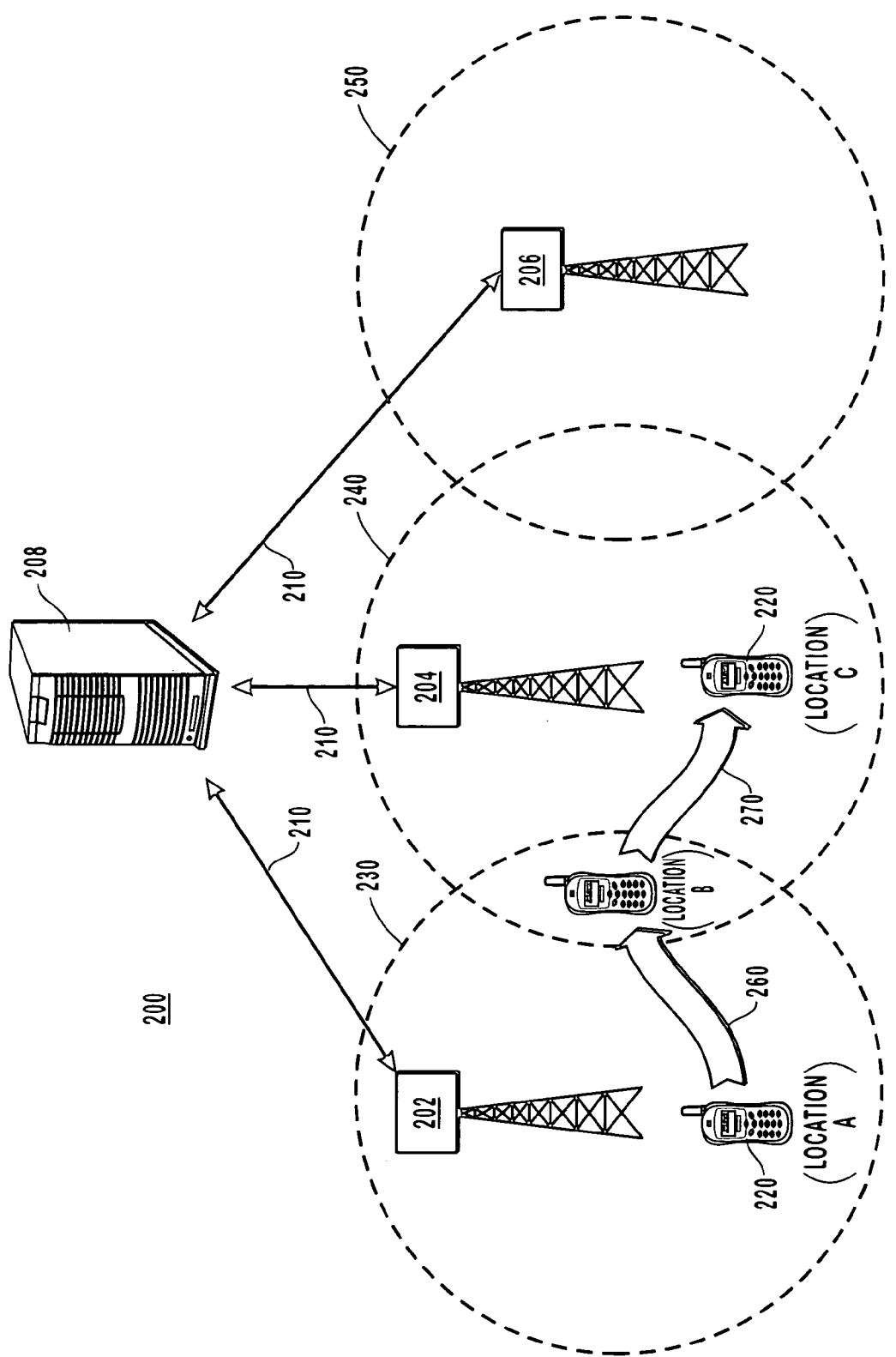
FIG. 2 illustrates a suitable wireless network environment in which the principles of the present invention may operate in which a station may wander through the range served by a number of wireless access points.

Attention is now directed to FIG. 2, which illustrates a wireless network environment 200 in which the principles of the present invention may operate. In this network environment 200, a plurality of wireless access points 202, 204, 206 are in communication with a network or authentication server 208 through one or more appropriate network links 210. The network links 110 can include any combination of wireless and wired communication links, including networked computing devices, the Internet and Ethernet.

Each of the wireless access points 202, 204, 206 is configured to enable a wireless communications device, such as the wireless device 100 of FIG. 1, to access the wireless communications network 200 through one or more appropriate protocols, including, but not limited to the 802.1x, IEEE 802.11, Bluetooth, Personal Area Networks (PAN) with Ultra Wide Band (UWB) technologies, and even wireless Wide Area Network technologies such as GPRS.

According to one embodiment, the wireless access points 202, 204, 206 each have a corresponding range for which they can provide service and network access to a wireless communications device. For example, the serviceable range of wireless access point 202 is illustrated by circle 230, while the serviceable range of wireless access point 204 is illustrated by circle 240, and while the serviceable range of wireless access point 206 is illustrated by circle 250. is located within the serviceable ranges 230, 240, 250 of the respective access points 202, 204, 206.

For example, in reference to FIG. 2, a station 220 comprising a wireless device, similar to the wireless device 100 of FIG. 1, can access the wireless network through access points 202 and 204 as the station 220 moves from location A to location C.

For simplicity, the ranges of the various access points 202, 204, 206 are illustrated as being approximately circular and approximately centered at the associated wireless access points 202, 204, 206. However, those of ordinary skill in the art will recognize that wireless access points 202, 204, 206 can have a variety of range shapes depending on the type and orientation of the antenna(s) of the wireless access point, and any physical obstacles within the range or otherwise confining the range. For example, in an unobstructed area, a wireless access point with an omni-directional antenna will take the approximate form of a sphere.

As is often the case, a wireless device is often mobile and thus may travel from and area served by one wireless access point communication to an area served by another wireless device. In such a case, the wireless device often switches communication between the various access points. For example, wireless device 220 is illustrated in FIG. 2 as traveling from location A (which is clearly within the range of wireless access point 202) to location B (which is within the range of both wireless access points 202 and 204) as represented by arrow 260. The wireless device 220 can move even further from location B to location C (which is clearly within the range of wireless access point 204, but no longer within the range of wireless access point 202). Accordingly, at some point in this process while the wireless device is within the range of both the wireless access points 202 and 204, the wireless device 220 will switch communication from access point 202 to access point 204.

Although the illustrated example includes three access points 202, 204, 206 having fairly uniform ranges of service, it will be appreciated that the invention also extends to embodiments in which there are more or less access points that have different serviceable ranges. The serviceable ranges 230, 240, 250 of the access points 202, 204 206 can also overlap more or less than is presently illustrated. Accordingly, in some embodiments, a wireless device 220 can have network access to any number of access points at the same time. Finally, it will also be appreciated by those of skill in the art that although the present embodiment illustrates a wireless network, the invention also extends to wired networks in which the access points can also be switches or access servers, as described above. Likewise, the stations seeking network access can also include wired devices, such as home computers, and are not limited to wireless devices, such as the wireless devices 100 and 220, shown in FIGS. 1 and 2.

Figure 3:
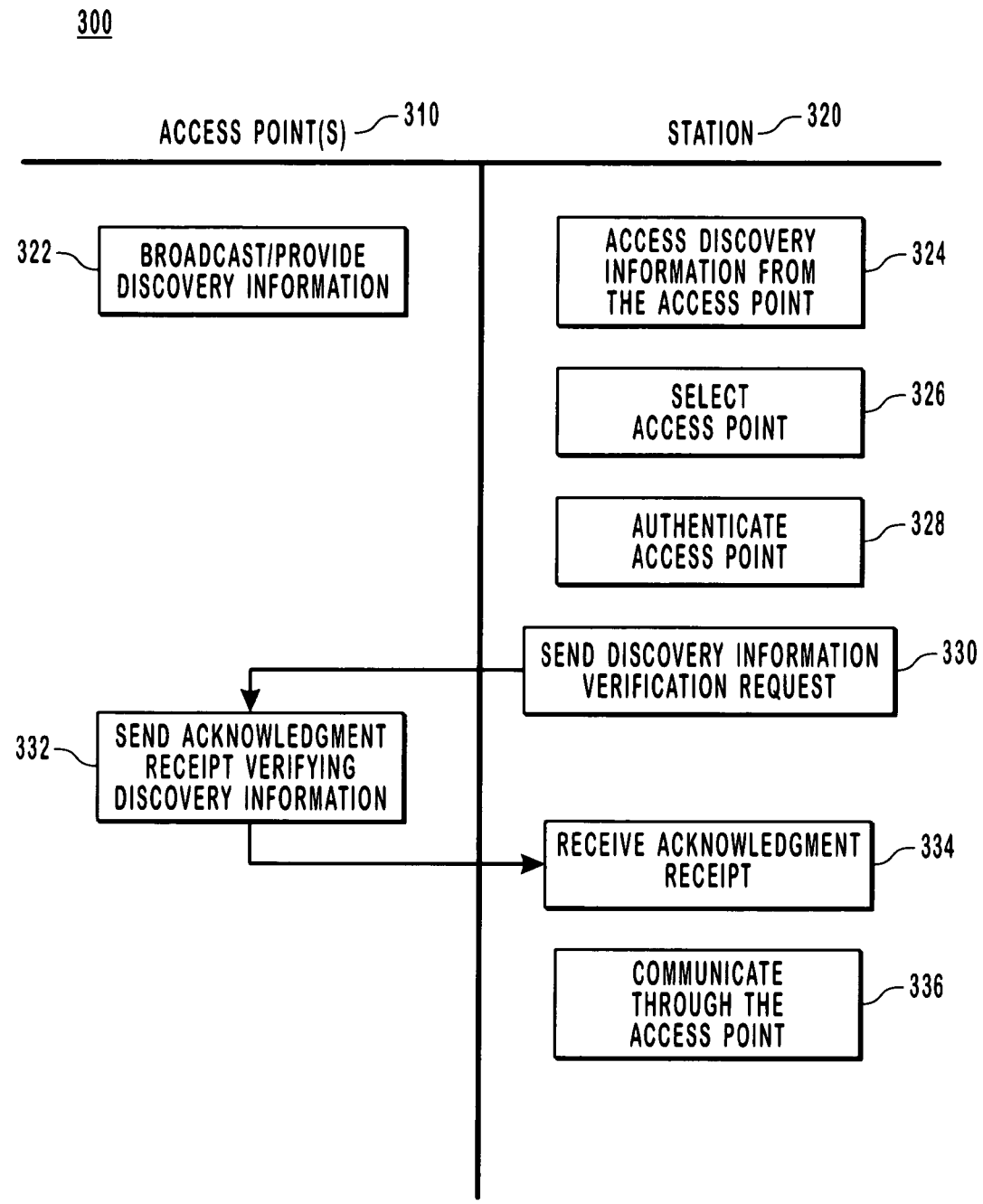
FIG. 3 illustrates a flowchart of various acts that can be performed by access points and stations for implementing methods of the invention.

FIG. 3 illustrates a flowchart 300 of a method for creating a secure association between an access point 310 and a station 320. The first illustrated act performed by the access point is to broadcast or provide discovery information (act 322) that can be access by a station. The act of providing discovery information (act 322) can be performed actively, such as by broadcasting the discovery information, or passively, such as by responding to queries and requests made by a station.

The discovery information preferably includes at least some of the capabilities of the access point. For example, the discovery information can include, but is not limited to, such things as signal strengths, transfer rates, security features (e.g., whether they support encryption), channels, restrictions, and so forth. In this regard, an access point 310 behaves similar to a vendors publicizing and selling its goods/services. On the other side, a station, such as the wireless devices 100 and 220 described in FIGS. 1 and 2, access the discovery information (act 324) and determine which access point will be selected (act 326) for establishing a desired network connection.

The selection of an access point (act 326) can be based on any number of factors. For example, in some embodiments, the selection is based on signal strength, while in other embodiments, the selection is based on the available data transfer rates. According to these examples, it will be appreciated that the selection of an access point can be based on dynamic factors that can change in response to such things as movement of the station between different service ranges, saturation of available bandwidth of an access point, and so forth.

With specific reference to FIG. 2, an example is provided to illustrate how a wireless device 220 might have a choice between two different access point 204, 206 when it is placed at location B. Accordingly, the wireless device 220 can decide which of the two different access points 204, 206 provide the best service, based on their published capabilities. However, because the published capabilities and access points themselves may be invalid or inaccurate, such as when discovery information is fraudulently generated or modified by a hack, it can be useful to authenticate the access point and verify the discovery information after it has been received, as described below, and prior to creating an association with the access point.

In one embodiment, the station authenticates the access point (act 328) by looking for a digital certificate that is attached to the communications received from the access point and that is signed by trusted certificate authority, such as the network server 208 or another trusted source known by the station.

In other embodiments, the authentication of the access point is only part of a mutual authentication in which the station is authenticated to the access point. For example, the access point may wish to authenticate the station prior to granting the station access to the network. Accordingly, during mutual authentication, information provided by the network server 208 can also be used to authenticate the station, as well as the access point.

During authentication (act 328), one or more identifiable security objects, such as keys, hash numbers, certificates, and combinations thereof, are obtained or created for subsequent use. The security objects can be associated with and created by the access point, the station, the server or any combination of the above.

One benefit of obtaining a security object, subsequent to authenticating the access point and/or station, is to perform discovery verification, in which the discovery information that was purportedly provided by the access point is verified by the access point as indeed being accurate.

For example, in one embodiment, upon authenticating the access point (act 328), the station 230 sends the discovery information back to the access point 310 in a verification request (act 330). The discovery information that is sent back can include all of the discovery information or any part of the discovery information that the station wishes to verify. The verification request can also include the identifiable security object obtained during authentication, which can be recognized by the access point and returned or responded to.

The access point 310 then sends an acknowledgement receipt back to the station verifying the discovery information. In one embodiment, the acknowledgement receipt includes the identifiable security object and the discovery information. In another embodiment, the acknowledgement receipt only includes the identifiable security object or a derivative of the security object. For example, in some embodiments, the acknowledgement receipt can include a hash number of the discovery information, an encryption key used to encrypt the discovery information, and combinations of the above.

The foregoing example, however, should not be construed as limiting the scope of the invention. In particular, it should be appreciated that the access point can utilize any form of an acknowledgement receipt to verify that the discovery information received from the station is correct and corresponds to the access point. Accordingly, the station interprets the acknowledgement receipt as a verification of the discovery information.

Upon receiving the acknowledgement receipt (act 334) from the access point, the station can then proceed to communicate with the network through the access point (act 336) in a secure association. Any communications between the access point 310 and the station 320 can subsequently be verified by attaching the identifiable security object to the communications, as described above in reference to the process for performing discovery verification.

It can be useful to verify subsequent communications between the access point and the station to further increase the security of the network and to protect the established association between the access point and the station from unauthorized tampering. In particular, the established association between the access point and the station can be subsequently modified and controlled by management frames that are received by the station and the access point. For example, during roaming, a station may issue disassociation management frames to a first access point that it is leaving the range of and issue re-association management frames to a new access point that it is entering the range of.

If bogus management frames are received, however, an association can be prematurely terminated or altered in some undesirable manner. Accordingly, before a management frame is processed, it can be useful to verify the management frame is actually received from an authorized party, as described below in reference to FIG. 4.

Figure 4:
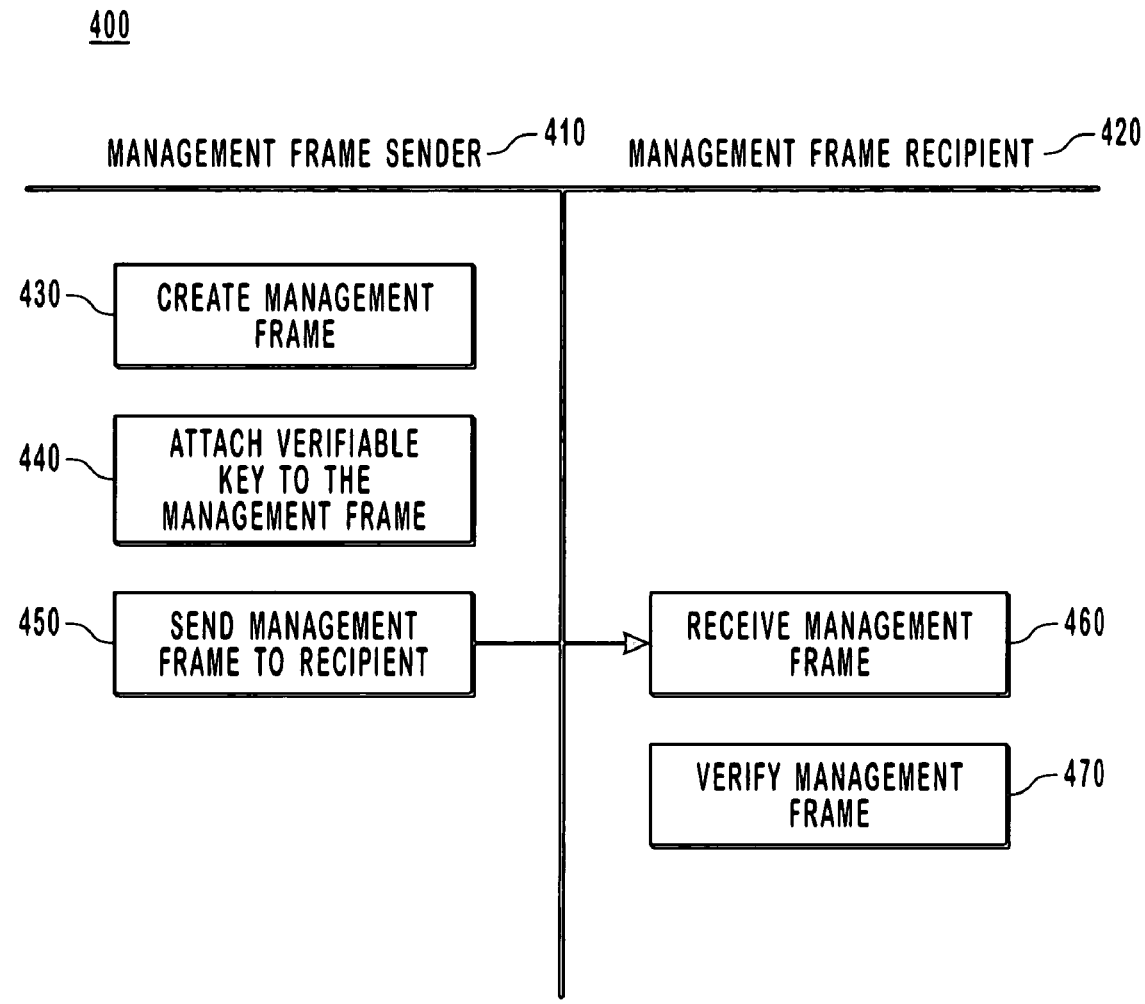
FIG. 4 illustrates another flowchart of various acts that can be performed for implementing methods of the invention.

As shown in FIG. 4, a flowchart 400 is provided that illustrates one embodiment of a method for performing management frame verification. The method includes various acts that are performed by a management frame sender 410 and a management frame recipient 420. It will be appreciated that the management frame sender 410 can be either the station or the access point. Likewise, the management frame recipient 420 can be either the station or the access point.

Initially, a management frame is created by the management frame sender (act 430). The management frame can be any type of frame that is intended to end, resume, modify, or otherwise control an association between the access point and the station. Some examples of management frames include a disassociation frame intended to end an association, a re-association frame intended to resume a terminated association, a re-association frame intended to create a new association between the station, and a new access point based on a preexisting authentication and recognition of the station.

Once the management frame is created (act 430), a verifiable key or other identifiable security object is attached to the management frame (act 440). The verifiable key can include, for example, a unique key that is provided by the server and that is associated with an access point.

In other embodiments, the identifiable security object or key includes a derivative of the original key assigned to the access point, thereby protecting the secrecy of the original key, while enabling other access points to recognize the derivative key. For example, the verifiable key can include a base key provided by the server and that is subsequently modified through an algorithm that accounts for a unique identifier of the access point, such that each access point has its own verifiable key that can be transferred to other access points for verification, and without compromising the security of the base server key.

In yet other embodiments, the verifiable key comprises a derivative of the identifiable security object obtained during authentication (See FIG. 3, act 328).

Attaching the verifiable key to the management frame can include encryption of the management frame with the verifiable key, using standard encryption technologies, or simply appending the management frame with the verifiable key.

The management frame, along with the verifiable key, is then sent to the recipient (act 450). Then, upon receiving the management frame (act 460), the recipient verifies the management frame (act 470), and preferably prior to executing the commands provided by the management frame.

According to one embodiment, verification of the management frame (act 470) includes recognizing the key that is attached to the management frame and decrypting the management frame, if necessary.

By way of example, if the wireless device 220 of FIG. 2 has an established association with access point 202 at location B but wishes to become associated with access point 204, the device 220 can create a first management frame to disassociate with access point 202 and a second management frame to become associated with access point 204. The second management frame can include such information as an indication that the device was previously associated with access point 202 and that the act of authenticating the device need not be performed again.

In such an example, the device 220 attaches the management frames with appropriate verifiable keys that can be recognized by the corresponding access points 202 and 204 to verify they are authentic and that they originated from authorized devices.

Once access point 202 receives and verifies the disassociation management frame, it terminates the existing association, knowing the termination was requested by the device rather than a hack. Likewise, access point 204 can receive and verify the re-association management frame to create a new association between the device and the network, knowing that the device is an authorized device. Access point 204 can be confident that the station is authorized by verifying the attached key, which only known to the authorized devices. It will be appreciated that in this manner a fast hand-off of the device from one access point to another can be performed.

Although the foregoing examples have primarily been drawn to embodiments in which associations are created between wireless devices and access points, it will be appreciated that the scope of the invention extends more broadly to the creation of secure associations between any network devices. Likewise, the embodiments describing verification of management frames should also be interpreted more broadly to extend to verification of any communications between networked devices.

Accordingly, the present invention may be embodied in other specific forms without departing from its spirit or essential characteristics. The described embodiments are to be considered in all respects only as illustrative and not restrictive. Although not required, some exemplary claims will now be presented to reflect at least some of the embodiments of the invention, as enabled by the disclosure provided herein.

The invention claimed is:

1. In a station that is capable of communicating with at least one access point in a communications network, a method for creating a secure association between the station and at least one access point, the method comprising:

at a station that is a client device seeking access to other client devices and a network by associating with and authenticating itself to one or more access points that bridge communications between the client device and a network communications server in the communications network, obtaining discovery information from the one or more access points in the communications network, the discovery information reflecting capabilities of the one or more respective access points to facilitate communication with the station;

selecting one of the access points to become associated with; and authenticating the selected access point, wherein authenticating the selected access point includes verifying the discovery information previously obtained from the one or more access points in the communications network by:

sending all of the discovery information obtained from the selected access point while previously obtaining discovery information back to the selected access point as part of a discovery verification request to be verified, wherein all of the discovery information previously obtained from the access point and sent back to the selected access point includes the capabilities of the selected access point and is sent back with a security object; and receiving an acknowledgement receipt from the selected access point verifying that the capabilities included in the discovery information sent back with the security object in the discovery verification request matches the capabilities included in the discovery information provided by the selected access point while obtaining discovery information from the one or more access points.

2. A method as recited in claim 1, wherein the security object is an identifiable security object obtained during authentication.

3. A method as recited in claim 2, wherein the identifiable security object includes at least one of an encryption key, a certificate, or a hash number.

4. A method as recited in claim 1, wherein authenticating the access point includes identifying a certificate from a trusted certificate authority.

5. A method as recited in claim 4, wherein the trusted certificate authority is a server of the communications network.

6. A method as recited in claim 1, wherein authenticating the access point is part of a mutual authentication that also involves the access point authenticating the station.

7. A method as recited in claim 1, further including an act of sending a frame to the access point after receiving the acknowledgment receipt, wherein the frame includes a verifiable key that indicates to the access point that the frame is actually received from the station.

8. A method as recited in claim 7, wherein the frame includes a management frame configured to control the secure association between the access point and the station.

9. A method as recited in claim 8, wherein the management frame is configured to terminate the secure association.

10. A method as recited in claim 1, wherein the discovery information obtained from the selected access point, and which is sent back to the selected access point as part of authenticating the selected access point, includes one or more of: signal strength information, transfer rate information, encryption support information, channel information, or restriction information.

11. A computer program product for use in a station that is capable of communicating with at least one access point in a communications network, the computer program product comprising one or more computer-readable storage media storing computer-executable instructions for implementing a method for creating a secure association between the station and at least one access point, the method comprising:

at a station that is a client device seeking access to other client devices and a network by associating with and authenticating itself to one or more access points that bridge communications between the client device and a network communications server in the communications network, obtaining discovery information from the one or more access points in the communications network, the discovery information reflecting capabilities of the one or more respective access points to facilitate communication with the station;

selecting one of the access points to become associated with; and authenticating the selected access point, wherein authenticating the selected access point includes verifying the discovery information previously obtained from the one or more access points in the communications network by:

sending all of the discovery information obtained from the selected access point while previously obtaining discovery information back to the selected access point as part of a discovery verification request to be verified, wherein all of the discovery information previously obtained from the access point and sent back to the selected access point includes the capabilities of the access point and is sent back with a security object; and receiving an acknowledgement receipt from the selected access point verifying that the capabilities of the access point as included in the discovery information sent back with the security object in the discovery verification request matches the capabilities of the access point as included in the discovery information provided by the selected access point during the obtaining of discovery information from the one or more access points.

12. A computer program product as recited in claim 11, wherein the security object is an identifiable security object obtained during authentication.

13. A computer program product as recited in claim 12, wherein the identifiable security object includes at least one of an encryption key, a certificate, or a hash number.

14. A computer program product as recited in claim 11, wherein authenticating the access point includes identifying a certificate from a trusted certificate authority.

15. A computer program product as recited in claim 14, wherein the trusted certificate authority is a server of the communications network.

16. A computer program product as recited in claim 11, wherein authenticating the access point is part of a mutual authentication that also involves the access point authenticating the station.

17. A computer program product as recited in claim 11, wherein the method further includes an act of sending a frame to the access point after receiving the acknowledgment receipt, wherein the frame includes a verifiable key that indicates to the access point that the frame is actually received from the station.

18. A computer program product as recited in claim 17, wherein the frame includes a management frame configured to control the secure association between the access point and the station.

19. A computer program product as recited in claim 18, wherein the management frame is configured to terminate the secure association.

20. In an access point that is capable of communicating with at least one station in a communications network, a method for creating a secure association between the station and at least one access point, the method comprising:

at an access point that bridges communication between one or more stations that are client devices seeking access to other client devices and a network by associating themselves with and authenticating themselves to one or more access points, providing discovery information to one of the one or more stations, the discovery information reflecting capabilities of the access point to facilitate communication with the one of the one or more stations;

providing a certificate with the discovery information that is used by the station to authenticate discovery information of the access point;

receiving all of the discovery information provided by the access point to the one of the one or more stations back from the one of the one or more stations as part of a discovery verification request from the one of the one or more stations, wherein the discovery verification request includes at least part of all of the discovery information provided by the access point to the one of the one or more stations while the one of the one or more stations was previously obtaining discovery information from multiple access points, including at least the capabilities of the access point as previously provided by the access point to the one or more stations; and sending an acknowledgement receipt to the station, thereby verifying to the one of the one or more stations that the received capabilities of the access point included in the discovery information sent back as part of the discovery verification request matches the capabilities of the access point included in the discovery information originally provided while the one of the one or more stations was obtaining discovery information from multiple access points.

21. A method as recited in claim 20, wherein the discovery verification request includes an identifiable security object obtained during authentication of the access point by the one of the one or more stations.

22. A method as recited in claim 21, wherein the identifiable security object includes at least one of an encryption key, a certificate, or a hash number.

23. A method as recited in claim 20, wherein the certificate is signed by a server of the communications network.

24. A method as recited in claim 20, further including an act of authenticating the one of the one or more stations as an authorized network device.

25. A computer program product for use in an access point that is capable of communicating with at least one station in a communications network, the computer program product comprising one or more computer-readable storage media storing computer-executable instructions for implementing a method for creating a secure association between the station and at least one access point, the method comprising:

at an access point that bridges communication between one or more stations that are client devices seeking access to other client devices and a network by associating themselves with and authenticating themselves to one or more access points, providing discovery information to the one of the one or more stations, the discovery information reflecting available transfer rate capabilities of the access point to facilitate communication with the one of the one or more stations;

providing a certificate with the discovery information that is used by the station to authenticate discovery information of the access point;

receiving all of the discovery information provided by the access point to the one of the one or more stations, back from the one of the one or more stations as part of a discovery verification request from the one of the one or more stations, wherein the discovery verification request includes at least the available transfer rate capabilities of the access point as provided by the access point to the one of the one or more stations while the one of the one or more stations was previously obtaining discovery information from multiple access points; and sending an acknowledgement receipt to the station, thereby verifying to the one of the one or more stations that the received discovery information sent back as part of the discovery verification request matches the discovery information originally provided while the one of the one or more stations was obtaining discovery information from multiple access points.

26. A computer program product as recited in claim 25, wherein the discovery verification request includes an identifiable security object obtained during authentication of the access point by the one of the one or more stations.

27. A computer program product as recited in claim 26, wherein the identifiable security object includes at least one of an encryption key, a certificate, or a hash number.

28. A computer program product as recited in claim 25, wherein the certificate is signed by a server of the communications network.

29. A computer program product as recited in claim 25, the method further including an act of authenticating the one of the one or more stations as an authorized network device.

* * * * *

UNITED STATES PATENT AND TRADEMARK OFFICE
CERTIFICATE OF CORRECTION

| | | |
|---|---|---|
| PATENT NO. | : 7,743,408 B2 | Page 1 of 1 |
| APPLICATION NO. | : 10/734817 | |
| DATED | : June 22, 2010 | |
| INVENTOR(S) | : Bernard D. Aboba et al. | |

It is certified that error appears in the above-identified patent and that said Letters Patent is hereby corrected as shown below:

In column 12, line 22, in Claim 20, after "one" insert -- of the one --.

Signed and Sealed this
Eighth Day of February, 2011

David J. Kappos
*Director of the United States Patent and Trademark Office*